Feb. 21, 1956  C. E. HOKE  2,735,793
PROCESSING OF RUBBER
Filed Oct. 10, 1952

INVENTOR.
CHARLES E. HOKE
BY James J. Long
AGENT

United States Patent Office 2,735,793
Patented Feb. 21, 1956

2,735,793
PROCESSING OF RUBBER

Charles E. Hoke, Ferndale, Mich., assignor to United States Rubber Company, New York, N. Y., a corporation of New Jersey Application October 10, 1952, Serial No. 314,016

6 Claims. (Cl. 134—6)

This invention relates to a method of processing rubber, and more particularly it relates to a method of treating the cloth liners used in processing rubber goods, to remove accumulated sulfur from such liners, thereby substantially improving the tack of rubber stock wound with cloth liners that have been in use for some time.

In manufacturing articles from rubber it is frequently the practice to wrap the raw vulcanizable rubber stock with a cloth liner, typically a cotton duck fabric, for the purpose of preventing the raw stock from sticking to itself or to other surfaces. Thus, for example, a continuous running length of pneumatic tire fabric, skim-coated with vulcanizable rubber stock by a calendering operation, is usually wound up into a roll, as it comes off the calender, with a concurrently wound cloth liner that serves to prevent successive turns of the fabric from sticking to each other. The composite roll of cloth liner and rubberized tire fabric can thus be transported about the factory or stored until such time as it is desired to cut the tire fabric into pieces of suitable length for the tire building operation. The cloth liner is removed as the composite roll is unwound for the cutting operation. The cloth liner is then returned to the calender for reuse with a subsequent batch of calendered tire fabric.

Over a period of time, such cloth liners tend to pick up, by purely mechanical means, appreciable quantities of sulfur which blooms on the surface of the sulfur-containing vulcanizable rubber stocks stored in the liner. As the liner accumulates sulfur with continued use, I have observed that the rubber stocks stored therein develop and retain bloomed sulfur in much greater quantities than would be expected if the same stock were simply supported freely in air, or if it were wrapped in a clean liner. I believe that this condition may be attributable to a crystal seeding effect, arising from the fact that crystals of bloomed sulfur are transferred from the contaminated liner to the surface of the stock, where they apparently actively promote crystallization of sulfur out of the stock around the original transferred seed crystal, with consequent appearance of abnormal quantities of sulfur bloom. This phenomenon, along with the reduced ability of the sulfur-contaminated liner to pick up more sulfur mechanically, results in occurrence of excessive sulfur blooms after the liner has been used repeatedly. Such sulfur bloom, if left on the surface of the rubber, greatly reduces the surface tack, and the resulting lack of adhesion seriously interferes with subsequent fabricating operations, such as tire building, where it is essential that the successively applied tire parts adhere firmly to each other.

It is possible to remove sulfur from a contaminated liner by washing the liner with hot caustic solutions, or with suitable solvents, such as carbon disulfide or polychlorinated hydrocarbons. However, such washing operations are relatively expensive and inconvenient, and require equipment other than the usually available processing equipment. The washing with hot caustic is essentially a severe laundering operation and tends to undesirably degrade and weaken the cellulose of which the liner is constituted. Furthermore, solvents are objectionable since they are usually toxic or imflammable, or both, and thereby present a hazard, as well as a nuisance by reason of their disagreeable odor. Washing of the liner is furthermore undesirable because the new liner frequently has been treated with such materials as soap and sodium silicate to provide it with an anti-adhesive finish. The washing tends to remove these anti-adhesive agents, to the detriment of the liner.

It is also possible to remove sulfur from the liner to a limited extent by mechanical means, such as steam blasting, vacuum cleaning, or simply beating the liner. However, such expedients are comparatively ineffective and they are generally inconvenient, and are likely to cause damage to the liner.

Accordingly, a principal object of the present invention is the provision of a method of treating a cloth liner that results in improved tackiness of rubber stocks stored in the liner.

It is another object of the invention to provide a more convenient and economical method of cleaning a cloth liner contaminated with sulfur or other compounding ingredients, in a manner that is effective, and not damaging to the liner.

The manner in which the invention accomplishes the foregoing objects, as well as additional objects and advantages, will be made manifest in the following detailed description of the invention, which is intended to be read with reference to the accompanying drawing, wherein.

Figure 1:
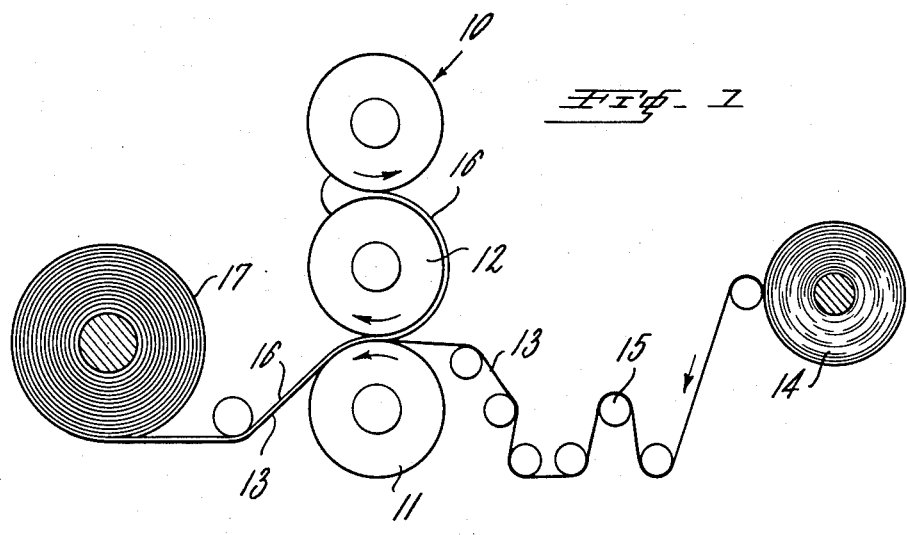
Fig. 1 is a diagrammatic elevational view, showing a contaminated cloth liner being wound up with a calendered layer of plastic material in accordance with the invention.
Figure 2:
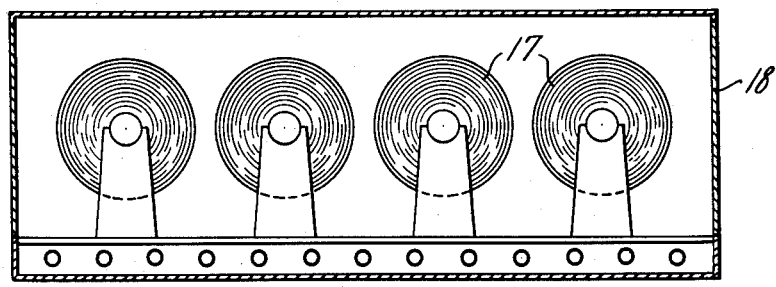
Fig. 2 is a similar view of composite rolls of plastic and liner being stored in a hot chamber.

In the preferred practice of the invention, sulfur or other migratory compounding ingredients are removed from a contaminated cloth liner by first bringing the contaminated liner into intimate contact with a raw plastomer, that is, a plastic material, conveniently in the form of a sheet or film, in which the sulfur or other compounding ingredients are readily soluble. The contaminated liner and the layer of plastic are then stored together for a definite period in intimate contact, suitably by rolling the liner and plastic together on a shell or spool. The thus-assembled liner and plastic are maintained together for a period of time sufficient for the bulk of the sulfur or other compounding ingredient to migrate or diffuse out of the liner, and dissolve in the plastic. This diffusion process is aided by elevated temperatures, and therefore the time required to clean the liner will vary inversely with the temperature at which the liner and plastic are stored together. In general, the time of treatment may vary from about 2 hours at a relatively highly elevated temperature, say 250° F., up to a period of as long as 30 days, or even more, at ordinary room temperatures (e. g. about 70° F.). Even longer storage periods may of course be used, but they are generally without proportionate added advantage. At the conclusion of the storage period, the plastic film or sheet is separated from the cloth liner. If the treatment has been carried out at elevated temperature, it is preferred to separate the liner and plastic before they are allowed to cool substantially from the temperature at which they were stored. Less conveniently, the assembly may be cooled very rapidly to room temperature or lower to obtain a supercooled solution of sulfur in the plastic, and the liner and the plastic may be separated before there has been an opportunity for the absorbed sulfur to bloom from the plastic. The cleaned liner is then ready for normal use as a liner for raw vulcanizable rubber stock in process of manufacture.

From the foregoing it will be seen that the invention preferably employs a plastomer as a medium to absorb the sulfur or other contaminants from the liner, when the plastomer is in intimate contact therewith. Suitable plastic materials for this purpose are any known normally solid plastic materials in which sulfur, or other compounding ingredients that it is desired to remove, is readily soluble. Raw rubber stock is admirably suited for this purpose. The raw rubber stock should of course contain no sulfur, or at least only such minor amounts of sulfur that it still has substantial capacity to attract and dissolve additional sulfur with which it comes in contact. This means, of course, that the rubber stock used for this purpose will contain far less sulfur, if it contains any at all, than a typical vulcanizable rubber stock would contain. Many other plastic materials may be used, such as polybutadiene, polyethylene, butadiene-styrene copolymer, butadiene-acrylonitrile copolymer, polysulfide rubber (Thiokol), reclaimed rubbers, and the like, either in the uncompounded state, or compounded with conventional rubber-soluble compounding ingredients, such as various fillers, accelerators, softeners, retarders, and so on, with the provision that the amount of elemental sulfur present be substantially less than the amount which is completely soluble in the plastic compound at the temperature at which the hot aging is carried out. Thus, for example, sulfur is soluble in rubber to the extent of some 5% at a temperature of about 200° F., and, accordingly, the sulfur content of rubber used in this treatment at a temperature of 200° F. should be appreciably less than 5% for efficient sulfur removal from the liner. Again, at a temperature of about 130° F., sulfur is soluble to the extent of some 2%, and this value will accordingly be a limiting maximum one when treating at that temperature. When the plastomer employed is a rubber that is inherently sulfur-vulcanizable, the amount of sulfur employed should preferably be less than that which would give rise to appreciable vulcanization under the conditions of the treatment. Most frequently, the stock used for the cleaning operation will not contain substantially more than 1% of sulfur.

For the purpose of winding the plastic up with the contaminated liner, the thickness of the plastic sheet is conveniently from about 0.01 to 0.25". The plastic and liner are preferably maintained in intimate contact with each other until a substantial proportion, say typically at least about one-half, of the sulfur contained in the liner has migrated out of the liner into the plastic. The contaminated liners that are cleaned by this process will typically be made of cotton duck and may contain from about 1% to 20% of sulfur, as a result of having been repeatedly contacted with a shaped raw vulcanizable rubber stock, such as calendered tire carcass stock, containing sulfur which blooms on the surface of the stock to a greater or less extent. The invention contemplates application of the present cleaning procedure when the liner has picked up so much sulfur by repeated contact with sulfur bloom on the surface of the vulcanizable rubber stocks, that the liner is approaching the point where it gives rise to excessive sulfur blooms in stocks therein, to the detriment of the surface tack of the rubber stock.

The following examples of this invention serve to illustrate the process further:

*Example 1*

Rubber smoked sheets are broken down by conventional methods to a Mooney viscosity of 45, and then calendered 0.1" thick and 60" wide, and immediately rolled up in a cloth liner 64" wide contaminated with 8.19% sulfur. This roll is placed in a heated room at 155° F. for 48 hours. Before the roll is allowed to cool, the rubber is separated from the liner. The liner then contains 0.38% sulfur. The tack of a calendered tire carcass stock containing 2% sulfur stored in this liner prior to cleaning for two days at 70° F. is rated as poor, while the tack of the same stock stored in the cleaned liner under the same conditions is rated as excellent. This indicates that the uncleaned liner allows sulfur bloom to accumulate on the stock, while the cleaned liner does not.

*Example 2*

Smoked hevea rubber sheet as described above is calendered 0.03" thick and 60" wide, then rolled up between a line 64" wide contaminated with 8.30% sulfur. This roll is placed in a heated room kept at 155° F. for 7 days. The roll is then cooled to 70° F. and the rubber is separated from the liner. The liner then contains 2.95% sulfur. A calendered stock test as described in Example 1 produces a rating of poor before the liner is cleaned, and a rating of good after the liner is cleaned.

*Example 3*

Example 1 is repeated, except that GR-S 10 (butadiene-styrene copolymer) plastomer is used and the liner originally contains 9.06% sulfur. After the cleaning operation, the liner contains 1.68% sulfur, and the tack test produces a rating of poor before cleaning and excellent after cleaning.

*Example 4*

Example 1 is repeated, except that the following plastomeric composition is used instead of smoked sheets.

| | Parts by weight |
|---|---|
| GR-S 10 | 100 |
| SRF Carbon Black | 60 |
| Hydrocarbon softener | 4 |
| Stearic acid | 3 |

The liner originally contains 9.06% sulfur. At the conclusion of the cleaning process, the liner contains 1.26% sulfur and the tack test of Example 1 produces a rating of excellent after cleaning, compared to poor before cleaning.

Figure 3:
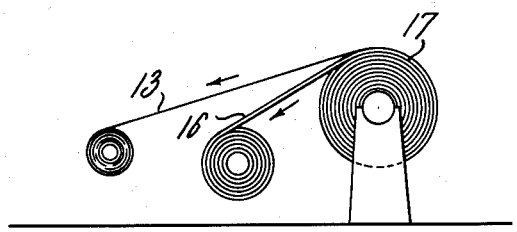
Fig. 3 shows the resulting cleaned liner being separated from the plastic film with which it was stored.

Referring to the drawing, a suitable arrangement for one mode of carrying out the invention includes a three roll calender 10, as shown in Fig. 1, between the lower rolls 11 and 12 of which the liner 13 to be cleaned may be passed. The liner is advanced from a supply roll 14 over a suitable arrangement of idler rollers 15, and thence into the calender, which serves to ply a thin layer 16 of the rubber stock. The sheet of plastic 16 is laid firmly on the liner, but without substantial pressure, so that the plastic does not imbed itself in and permanently adhere to the fibers. The composite of fabric and plastic is wound up into a roll 17 under moderate tension immediately after coming from the calender. A plurality of the rolls 17 may then be stored in a suitable heated oven or hot room 18 for the desired length of time. At the conclusion of the storage period, the roll 17 is unwound to separate the cleaned liner 13 from the plastic film 16, as shown in Fig. 3.

In general, the process is most efficient under the following conditions:

1. The thickness of the plastomer layer is relatively high.
2. The temperature during the liner-plastomer aging operation is relatively high. A preferred elevated temperature range for this aging is from 120° F. to 250° F.
3. The time of hot aging is relatively long. From 1 to 10 days represents a preferred time of storage.
4. The contact of the liner and the plastomer compound is relatively intimate. Intimate contact may be insured by winding the liner and plastic sheet together into a tightly wound roll.

5. The plastomer is separated from the liner before any substantial cooling takes place.

6. The plastomeric material is substantially free from sulfur before the cleaning operation.

There are many advantages consequent to using a material which is plastic as the solvent or sorptive material for the sulfur, in accordance with the invention. Since the plastic material is normally solid, it does not have the disadvantages of liquid solvents or cleaning materials. The present process is carried out without any chemical change or degradation of the liner.

Furthermore, the process can be carried out with no more physical change in the configuration of the liner fabric than is involved in the normal use of the liner in processing rubber stocks. This is important from the standpoint of maintaining the anti-adhesive qualities of the liner, as well as the strength and durability of the liner.

Only conventional rubber or plastic processing machinery is required for carrying out the present process.

The process is particularly economical in view of the fact that it is possible to use the plastomeric material for manufacturing other items after its utility as a liner-cleaning means is exhausted. For this purpose, the rubber stocks employed should preferably be essentially non-vulcanizable at the temperature of the treatment.

The present cleaning process is highly effective in that it does not remove soap or sodium silicate finishes that are sometimes applied to liners as anti-adhesive treatments.

The benefits of the invention with respect to the improved tackiness of vulcanizable rubber stocks that are stored in the cleaned liner have been found in actual factory practice to be remarkable. Thus, for example, in some cases rubberized tire fabric that had been stored in contact with an uncleaned liner was so poor in tack that it had to be cemented in order to be usable. In contrast, the same fabric stored in a liner cleaned in accordance with the invention had excellent tack. The improved tack realizable as a consequence of the present cleaning method results not only from the efficient prevention of sulfur blooms on vulcanizable stocks stored in the liner, but is also attributable in significant measure to the fact that the present cleaning method does not change the configuration of the fibers in the liner. No other known cleaning method is believed to give a cleaned liner with so little change in the structure of the liner itself.

The present method of cleaning liners is especially suited for use in conjunction with the processing of pneumatic tire fabric. Such processes involve calendering and vulcanizing rubber carcass stock onto the tire fabric, and winding the calendered tire fabric with the liner for storage until such time as it is desired to further process the tire fabric, whereupon the liner is removed and reused with a subsequent batch of tire fabric. It is of greatest importance here that the liner should not give rise to excessive sulfur bloom on the surface of the carcass stock. The present cleaning method makes for increased efficiency, since a uniformly high standard of tackiness of the tire fabric may be maintained in production, with consequent improved tire building operations. The difference in the quality of tire fabric stored in contact with a liner cleaned in accordance with the invention and in contact with an uncleaned liner may, in fact, be observed visually. A definite sulfur bloom is readily observable on the tire fabric stored in contact with the uncleaned liner, whereas the stock stored in contact with the cleaned liner is seen to be substantially free from sulfur bloom, and is definitely tacky to the touch.

Having thus described my invention, what I claim and desire to protect by Letters Patent is:

1. In a method of processing raw sulfur-containing vulcanizable rubber stocks which tend to form sulfur bloom on their surface, including the steps of shaping the vulcanizable rubber stock and storing the shaped stock in contact with a cloth liner, subsequently removing the liner, and thereafter reusing the liner with a subsequent batch of vulcanizable rubber stock, until the liner becomes contaminated with a definite amount of bloomed sulfur picked up from the surface of the said raw sulfur-containing vulcanizable rubber stocks, the improvement which comprises the step of cleaning the said contaminated liner by intimately contacting the liner with a normally solid plastic material in which the sulfur contained in the contaminated liner is soluble, maintaining the said liner and plastic in intimate contact for a sufficient period of time for the sulfur to diffuse out of the liner and into the plastic, and thereafter separating the plastic containing the dissolved sulfur from the resulting cleaned liner, said solid plastic material being sufficiently free of sulfur, before contacting the plastic with the sulfur-contaminated cloth liner, to have substantial capacity to attract and dissolve additional sulfur with which it comes in contact, whereby the plastic acts as a solid solvent medium for dissolving the contaminating sulfur from the cloth liner.

2. A method of cleaning a sulfur-contaminated cloth liner for use in processing rubber stocks comprising in combination the steps of contacting the liner with a normally solid plastic material in which the sulfur contained in the contaminated liner is soluble, maintaining the said liner and plastic in intimate contact for a sufficient period of time for the sulfur to diffuse out of the liner and into the plastic, and thereafter separating the plastic containing the dissolved sulfur from the resulting cleaned liner, said solid plastic material being sufficiently free of sulfur, before contacting the plastic with the sulfur-contaminated cloth liner, to have substantial capacity to attract and dissolve additional sulfur with which it comes in contact, whereby the plastic acts as a solid solvent medium for dissolving the contaminating sulfur from the cloth liner.

3. A method as in claim 2 in which the plastic is a non-vulcanizable raw rubber stock.

4. A method as in claim 3 in which the contaminated liner and raw rubber stock are intimately contacted by winding them up tightly in a roll.

5. A method as in claim 4 in which the contaminated liner and raw rubber stock are stored at a temperature in the range of from 120° to 250° F., for from 1 to 7 days.

6. A method as in claim 5 in which the liner and raw rubber stock are separated after the said storage, prior to substantial cooling.

References Cited in the file of this patent

UNITED STATES PATENTS

| | | |
|---|---|---|
| 1,434,892 | Harrison | Nov. 7, 1922 |
| 1,478,576 | Morton | Dec. 25, 1923 |
| 1,603,320 | Conroy | Oct. 19, 1926 |